US006813996B1

(12) United States Patent
Kao

(10) Patent No.: US 6,813,996 B1
(45) Date of Patent: Nov. 9, 2004

(54) JUICER WITH OPERATIONAL CONVENIENCE

(76) Inventor: I-Feng Kao, No. 6, Shin-Ho 2nd Rd., Tainan (TW)

( * ) Notice: Subject to any disclaimer, the term of this patent is extended or adjusted under 35 U.S.C. 154(b) by 0 days.

(21) Appl. No.: 10/749,837

(22) Filed: Dec. 31, 2003

(51) Int. Cl.[7] .............................. A23L 1/00; A23N 1/00; A47J 19/02
(52) U.S. Cl. .............................. 99/507; 99/506; 99/508
(58) Field of Search .......................... 99/495, 501–508, 99/485, 349; 100/125, 98 R, 283, 213, 110, 131–135; 210/307, 514; D7/665, 666

(56) References Cited

U.S. PATENT DOCUMENTS

| | | | | |
|---|---|---|---|---|
| 2,238,571 A | * | 4/1941 | Scott | 99/507 |
| 2,497,335 A | * | 2/1950 | Wissner | 99/507 |
| 2,674,182 A | * | 4/1954 | Kirkpatrick | 100/288 |
| 2,786,502 A | * | 3/1957 | Turner | 99/595 |
| 5,520,105 A | * | 5/1996 | Healy | 100/98 R |

\* cited by examiner

*Primary Examiner*—Timothy F. Simone
(74) *Attorney, Agent, or Firm*—Alan D. Kamrath; Nikolai & Mersereau, P.A.

(57) ABSTRACT

A juicer includes a base, a column extending upright from the base, a head securely attached to an upper end of the column, a vertical rod extending vertically through the head, a Y-shaped handle having a main section and two arms branching from an end of the main section, and two connecting rods. A connecting member is securely attached to a lower end of the vertical rod. The distal ends of the arms of the handle are connected to the head by an axle. The lower ends of the connecting rods are pivotally connected to two ears respectively on two sides of the connecting member. The upper ends of the connecting rods are pivotally connected to two lugs formed on intermediate portions of the arms. Oil grooves are provided in the ears, in the lugs, and in two ends of the axle, allowing smooth operation of the juicer.

7 Claims, 4 Drawing Sheets

US 6,813,996 B1

JUICER WITH OPERATIONAL CONVENIENCE

BACKGROUND OF THE INVENTION

1. Field of the Invention

The present invention relates to a juicer with operational convenience.

2. Description of the Related Art

U.S. Pat. No. 6,553,899 discloses a juicer with an easy-to-assemble pivotal connection for the handle of the juicer. The juicer comprises a base, a column extending upright from the base, and a head securely attached to an upper end of the column, with the head having a vertical hole and a transverse hole. A vertical rod extends vertically through the vertical hole of the head. A pressure cup is securely attached to a lower end of the vertical rod by a connecting member. A Y-shaped handle includes a main section and two arms branching from an end of the main section. Each arm includes a distal end having a hole aligned with the transverse hole of the head. Two connecting rods are provided and each has an upper end and a lower end. The upper end of the respective connecting rod is connected to an intermediate portion of a respective arm of the handle. An axle is pivotally extended through the transverse hole of the head and the holes of the handle. Each of two ends of the axle has an annular groove. A first retainer is mounted in each annular groove of the axle for preventing disengagement of the axle. The connecting member includes two ears respectively extending outward from two sides thereof. The respective car has an annular groove and extends through the lower end of the respective connecting rod. A second retainer is mounted in the annular groove of each ear for preventing disengagement of the connecting rod. A pin is extended through the upper end of each connecting rod and the intermediate portion of each arm of the handle. A third retainer is mounted in an annular groove in the respective pin for preventing disengagement of said handle.

Although the juicer provides a simplified structure while providing a force-saving effect, the user still has to apply a force to return the Y-shaped handle after pressing fruit. Further, relatively high friction contact exists between the axle and a periphery delimiting the transverse hole of the head, between the respective end of the axle and the distal end of the respective arm, between the respective ear and the respective connecting rod, and between the respective pin and the respective arm. As a result, the Y-shaped handle cannot be operated smoothly.

SUMMARY OF THE INVENTION

An object of the present invention is to provide a juicer with operational convenience and/or operational smoothness.

In accordance with an aspect of the invention, a juicer includes a base, a column extending upright from the base, and a head securely attached to an upper end of the column. The head includes a vertical hole and a transverse hole. A vertical rod extends vertically through the vertical hole of the head and has a lower end and an upper end. A connecting member is securely mounted to the lower end of the vertical rod to move therewith. The connecting member includes two ears respectively extending from two sides thereof, with each ear having an oil groove. A pressure cup is securely attached to the lower end of the vertical rod to move therewith.

A Y-shaped handle includes a main section and two arms branching from an end of the main section. Each arm has an intermediate portion and a distal end. A lug is formed on the intermediate portion of each arm and has an oil groove. Two connecting rods are provided and each has an upper end and a lower end. The upper end of the respective connecting rod is connected to the intermediate portion of the respective arm and surrounds the oil groove of the respective lug, allowing smooth relative pivotal movement between the Y-shaped handle and the upper end of the respective connecting rod. The lower end of the respective connecting rod is mounted to the respective ear of the connecting member and surrounds the oil groove of the respective ear, allowing smooth relative pivotal movement between the lower end of the respective connecting rod and the respective ear.

An axle pivotally extends through the transverse hole of the head and the distal ends of the arms. The axle has two ends each having an oil groove surrounded by the head, allowing smooth pivotal movement of the axle relative to the head.

Thus, smooth operation of the juicer is provided. Further, the juicer may further include an elastic element mounted around the vertical rod for returning the Y-shaped handle and the vertical rod to their original position.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
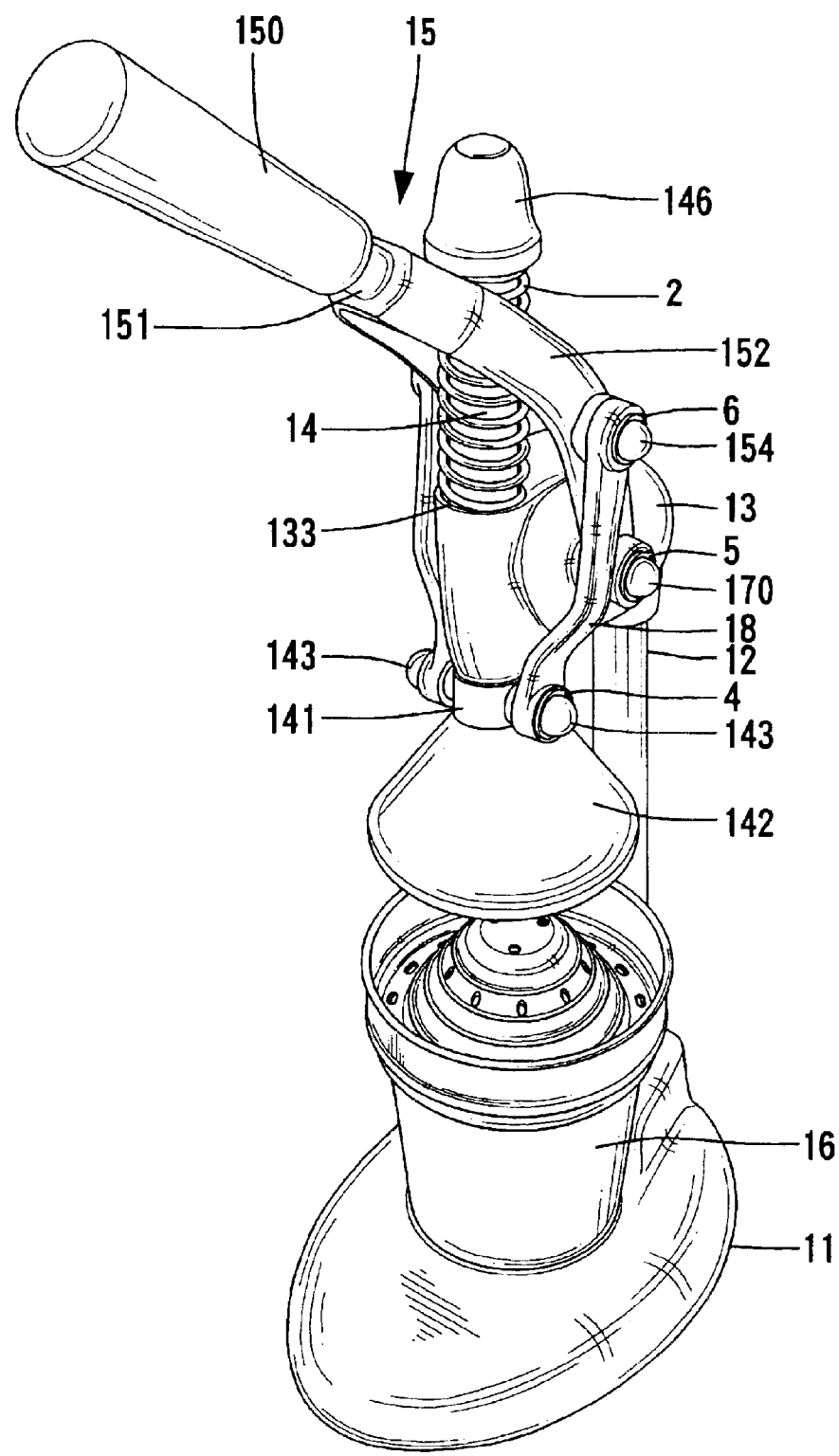
FIG. 1 is a perspective view of a juicer in accordance with the present invention.
Figure 2:
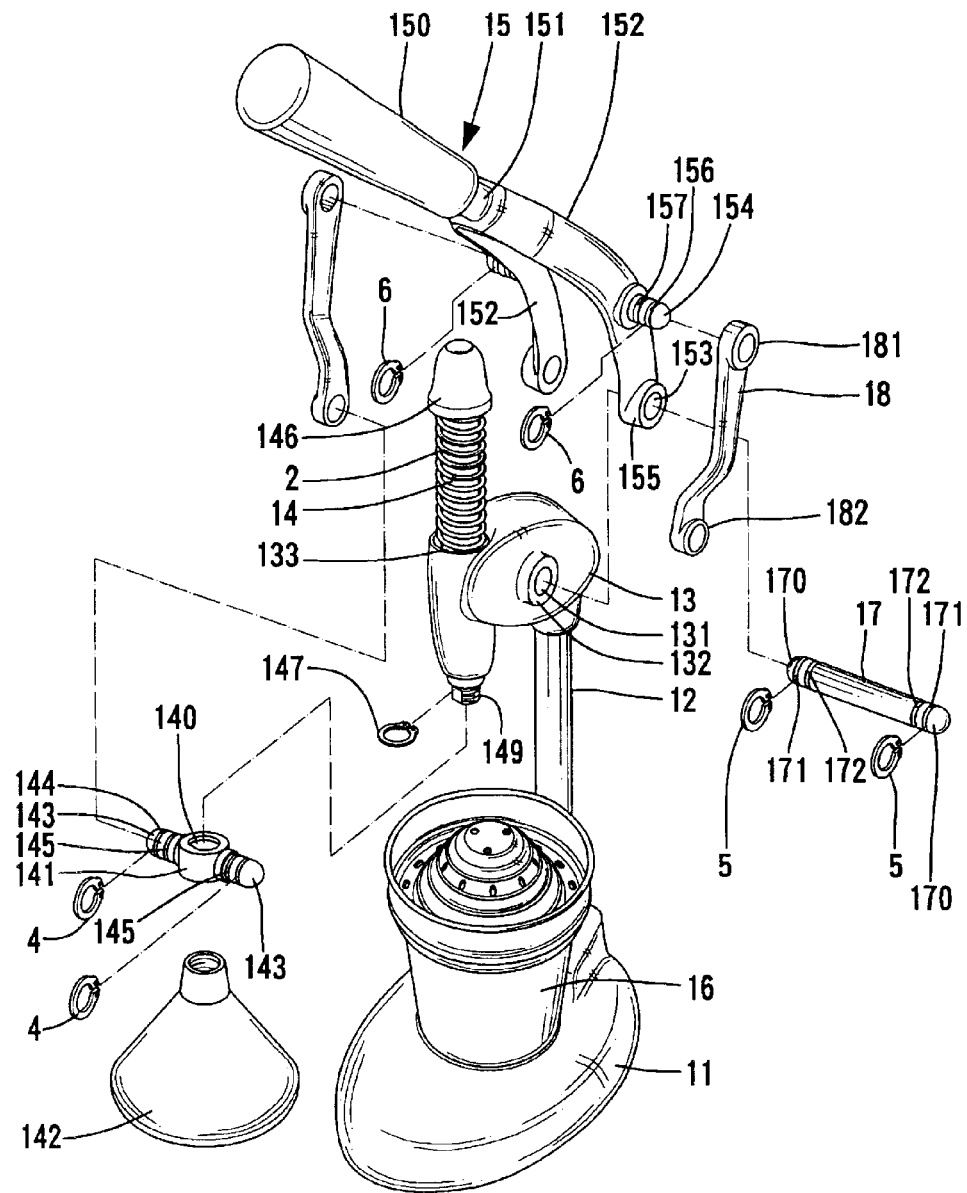
FIG. 2 is an exploded perspective view of the juicer in accordance with the present invention.

Referring to FIGS. 1 through 4, a juicer in accordance with the present invention generally comprises a base 11, a column 12 extending upright from a side of the base 11, a head 13 securely attached to an upper end of the column 12, a vertical rod 14 extending vertically through the head 13, and a Y-shaped handle 15 for effecting vertical movement of the vertical rod 14. A detachable pressure cup 142 and a connecting member 141 are mounted to a lower end of the vertical rod 14. A bracket 16 is attached to an intermediate portion of the column 12 for receiving fruit to be pressed by the pressure cup 142.

The head 13 includes a pivotal section 132 having a transverse hole 131 in which an axle 17 is pivotally mounted. The axle 17 includes an annular groove 171 in each of two ends 170 thereof. Further, each end 170 of the axle 17 has an oil groove 172 for receiving lubricating oil or grease. A retainer 5 (such as a C-clip) is partially received in each annular groove 171 of the axle 17, thereby preventing the axle 17 from disengaging from the head 13. The head 13 further includes a vertical hole 133 through which the vertical rod 14 extends.

Figure 4:
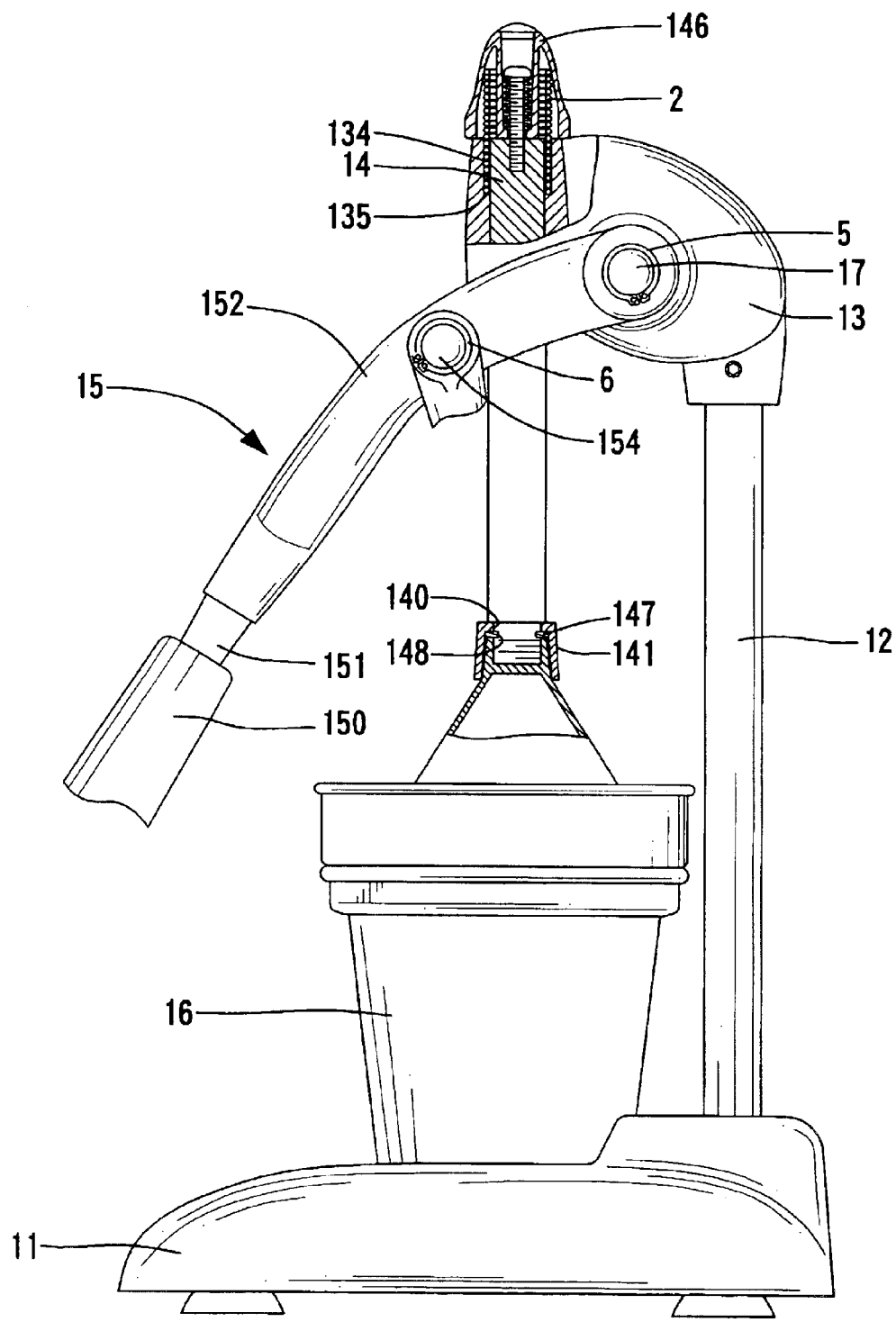
FIG. 4 is a side view, partly sectioned, of the juicer in accordance with the present invention, wherein a handle of the juicer is lowered for pressing fruit.

The connecting member 141 includes an ear 143 extending outward from each of two ends thereof. Each ear 143 is substantially cylindrical and includes an annular groove 144 and an oil groove 145 for receiving lubricating oil or grease. The connecting member 141 includes a central hole 140 so as to be mounted around a lower end of the vertical rod 14 extending beyond the head 13, and a retainer (such as a C-clip) 147 is partially received in an annular groove 148 (see FIG. 4) in the lower end of the vertical rod 14, thereby positioning the connecting member 141. The pressure cup 142 has a screw hole (not labeled) threadedly engaged with a threaded section 149 of the lower end of the vertical rod 14. Further, an elastic element 2 is mounted around an upper portion of the vertical rod 14 that extends beyond the head 13. As illustrated in FIG. 4, a cap 146 is located above an upper end of the vertical rod 14 and movable along a vertical direction. The elastic element 2 has an upper end securely attached to an inner periphery of the cap 146 and a lower end abuts against the head 13. In this embodiment, the head 13 includes an annular receiving space 134 (FIG. 4) surrounding the vertical rod 14, with the lower end of the elastic element 2 abutting against an end wall 135 delimiting the annular receiving space 134.

The Y-shaped handle 15 includes a main section 151 and two arms 152 branching off from an end of the main section 151. A grip 150 is provided on the other end of the main section 151. Each arm 152 has a ring 155 formed on a distal end thereof. The rings 155 are located outside the pivotal section 132 of the head 13, with the holes 153 of the rings 155 being aligned with the transverse hole 131 of the pivotal section 132. A lug 154 is formed on an outer side of an intermediate portion of each arm 152 of the handle 15. Each lug 154 has an annular groove 156 and an oil groove 157 for receiving lubricating oil or grease.

Two connecting rods 18 are provided for connecting the handle 15 to the connecting member 141. Each connecting rod 18 has an upper end 181 having a hole (not labeled) so as to be mounted around the respective lug 154. Each connecting rod 18 includes a lower end 182 having a hole (not labeled) so as to be mounted around the respective ear 143 of the connecting member 141.

Figure 3:
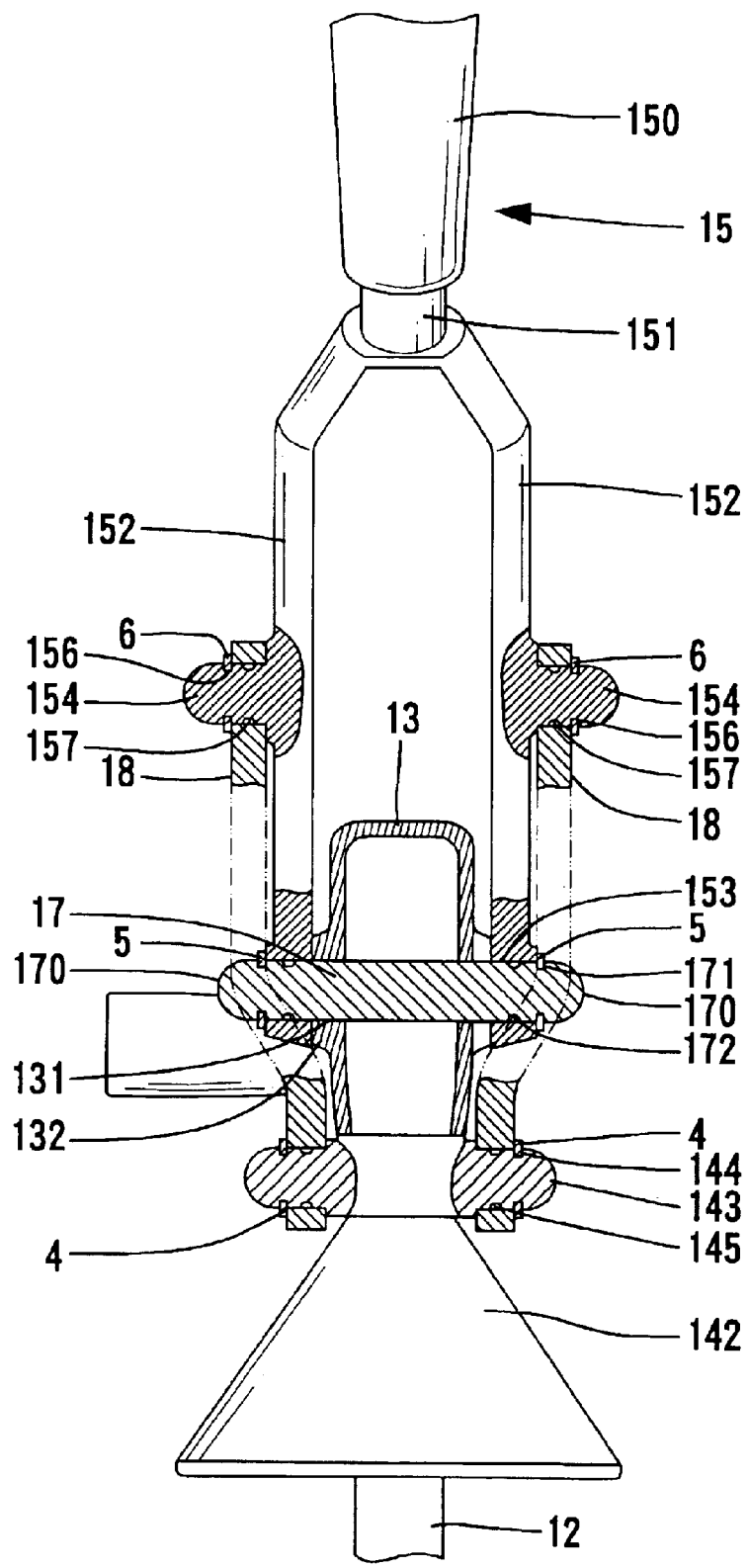
FIG. 3 is a front view, partly sectioned, of a portion of the juicer in accordance with the present invention.

In assembly, the axle 17 is extended through the rings 155 of the handle 15 and the transverse hole 131 of the pivotal section 132 of the head 13 such that the handle 15 may pivot about a longitudinal axis of the axle 17. As illustrated in FIG. 3, the oil groove 172 of the respective end 170 of the axle 17 is received in the pivotal section 132 of the head 13, allowing smooth pivotal movement of the axle 17 relative to the head 13.

The upper end 181 of the respective connecting rod 18 is mounted to the respective lug 154 and surrounds the respective oil groove 157, and a retainer 6 (such as a C-clip) is partially received in the annular groove 156 in the respective lug 154 to prevent disengagement of the handle 15. The pivotal movement of the respective connecting rod 18 is smooth due to provision of lubricating oil or grease in the oil groove 157 of the respective lug 154, as shown in FIG. 3.

The lower end 182 of the respective connecting rod 18 is mounted to the respective ear 143 of the connecting member 141. A further retainer 4 is mounted in the annular groove 144 in each ear 143 of the connecting member 141 to thereby prevent disengagement of the connecting rod 18. As illustrated in FIG. 3, the oil groove 145 of the respective ear 143 is surrounded by the lower end 182 of the respective connecting rod 18, allowing smooth pivotal movement of the respective connecting rod 18 relative to the respective ear 143.

The vertical rod 14 is moved vertically upon pivotal movement of the handle 15 for effecting pressing of fruit received in the bracket 16. The elastic element 2 is compressed when the vertical rod 14 is moved downward for pressing fruit in response to downward movement of the handle 15, as shown in FIG. 4. When the handle 15 is released, the handle 15 and the vertical rod 14 return to their initial position under the action of the elastic element 2. Thus, the juicer in accordance with the present invention possesses operational convenience.

Although the invention has been explained in relation to its preferred embodiment, it is to be understood that many other possible modifications and variations can be made without departing from the scope of the invention as hereinafter claimed.

What is claimed is:

1. A juicer comprising:

a base;

a column extending upright from the base;

a head securely attached to an upper end of the column, the head including a vertical hole and a transverse hole;

a vertical rod extending vertically through the vertical hole of the head and having a lower end and an upper end;

a connecting member securely mounted to the lower end of the vertical rod to move therewith, the connecting member including two ears respectively extending from two sides thereof, each said ear having an oil groove;

a pressure cup securely attached to the lower end of the vertical rod to move therewith;

a Y-shaped handle including a main section and two arms branching from an end of the main section, each said arm having an intermediate portion and a distal end, a lug being formed on the intermediate portion of each said arm and having an oil groove;

two connecting rods each having an upper end and a lower end, the upper end of the respective connecting rod being connected to the intermediate portion of the respective arm and surrounding the oil groove of the respective lug, allowing smooth relative pivotal movement between the Y-shaped handle and the upper end of the respective connecting rod, the lower end of the respective connecting rod being mounted to the respective ear of the connecting member and surrounding the oil groove of the respective ear, allowing smooth relative pivotal movement between the lower end of the respective connecting rod and the respective ear; and an axle pivotally extending through the transverse hole of the head and the distal ends of the arms, the axle having two ends each having an oil groove surrounded by the head, allowing smooth pivotal movement of the axle relative to the head.

2. The juicer as claimed in claim 1, wherein each said end of the axle includes an annular groove for receiving a retainer.

3. The juicer as claimed in claim 1, wherein each said ear includes an annular groove for receiving a retainer.

4. The juicer as claimed in claim 1, wherein each said includes an annular groove for receiving a retainer.

5. The juicer as claimed in claim 1, wherein the vertical rod has an upper portion extending beyond the head, an elastic element being mounted around the upper portion of the vertical rod for returning the Y-shaped handle and the vertical rod to their initial position.

6. The juicer as claimed in claim 5, further including a cap above the upper end of the vertical rod, the elastic element having an upper end attached to the cap and a lower end attached to the head.

7. The juicer as claimed in claim 6, wherein the head includes an annular receiving space surrounding the vertical rod, and wherein the lower end of the elastic element abuts against an end wall delimiting the annular receiving space.

* * * * *